United States Patent
Lewis

(10) Patent No.: US 6,600,856 B1
(45) Date of Patent: Jul. 29, 2003

(54) LENSED OPTICAL FIBERS AND UNIQUE MICROPIPETTES WITH SUBWAVELENGTH APERTURES

(75) Inventor: Aaron Lewis, Jerusalem (IL)

(73) Assignee: Nanoptics, Ltd., Jerusalem (IL)

( * ) Notice: Subject to any disclaimer, the term of this patent is extended or adjusted under 35 U.S.C. 154(b) by 0 days.

(21) Appl. No.: 09/856,304

(22) PCT Filed: Dec. 3, 1999

(86) PCT No.: PCT/US99/27913
§ 371 (c)(1),
(2), (4) Date: May 21, 2001

(87) PCT Pub. No.: WO00/34810
PCT Pub. Date: Jun. 15, 2000

(30) Foreign Application Priority Data

Dec. 6, 1998 (IL) ................................................. 127404

(51) Int. Cl.⁷ ............................. G02B 6/00; C03C 25/00
(52) U.S. Cl. ............................. 385/33; 385/12; 65/392; 219/121.66
(58) Field of Search ....................... 385/12, 33; 65/392, 65/393, 439; 219/121.6, 121.65, 121.66, 121.71

(56) References Cited

U.S. PATENT DOCUMENTS

| | | | | |
|---|---|---|---|---|
| 3,904,277 A | * | 9/1975 | Phillips et al. | 385/115 |
| 4,143,940 A | * | 3/1979 | Khoe | 385/33 |
| 4,641,912 A | * | 2/1987 | Goldenberg | 385/43 |
| 4,917,462 A | | 4/1990 | Lewis et al. | |
| 4,932,989 A | | 6/1990 | Presby | |
| 5,254,854 A | * | 10/1993 | Betzig | 250/234 |
| 5,264,698 A | * | 11/1993 | Kopelman et al. | 250/307 |
| 5,361,314 A | | 11/1994 | Kopelman et al. | |
| 5,485,536 A | | 1/1996 | Islam | |
| 5,627,922 A | * | 5/1997 | Kopelman et al. | 385/12 |
| 5,675,433 A | * | 10/1997 | Lewis | 359/385 |
| 5,677,978 A | | 10/1997 | Lewis et al. | |
| 5,990,474 A | * | 11/1999 | Atia et al. | 250/234 |
| 6,285,811 B1 | * | 9/2001 | Aggarwal et al. | 385/31 |
| 6,370,306 B1 | * | 4/2002 | Sato et al. | 385/129 |
| 6,430,324 B1 | * | 8/2002 | Muramatsu et al. | 385/12 |

FOREIGN PATENT DOCUMENTS

JP 06-242331 * 9/1994
JP 09-184930 * 7/1997

* cited by examiner

Primary Examiner—Rodney Bovernick
Assistant Examiner—Juliana K. Kang
(74) Attorney, Agent, or Firm—Jones, Tullar & Cooper, PC

(57) ABSTRACT

A method for producing subwavelength near-field optical apertures includes directing a laser beam at the top of a tapered optical fiber to melt the fiber tip. The melting forms a lens at the tip, and the resulting structure is then coated with metal in such a way that an aperture is left open, or the aperture is formed in the metal by means of an ion beam or a laser beam. In another embodiment, the tip of a micropipette is melted by a laser beam to form an aperture having thick walls.

13 Claims, 2 Drawing Sheets

LENSED OPTICAL FIBERS AND UNIQUE MICROPIPETTES WITH SUBWAVELENGTH APERTURES

I FIELD OF THE INVENTION

The need for subwavelength apertures spans many area of science and technology from subwavelength optical imaging and nanofabrication with near field optics to electrical measurements of cellular biology with subwavelength apertures in micropipettes. The field of this invention is a method for making such a subwavelength aperture at the tip of an optical fiber that also behaves as a lens and for making micropipettes with apertures from as small as tens of nanometers with wall thicknesses as large as 1 mm.

II BACKGROUND OF THE INVENTION

One reason for developing new methods to produce subwavelength apertures is that the field of near-field optics is one of the fastest growing areas of science and technology today. Previously, the most successful method for creating near-field optical apertures was the use of techniques to taper glass in order to provide is a subwavelength region at the tip of the tapered glass structure which could be coated with metal in order to produce a subwavelength aperture at the tip. [A. Harootunian, E. Betzig, M. S. Isaacson, and A. Lewis; Appl. Phys. Lett. 49,674 (1986); A. Lewis, M. Isaacson, E. Betzig, and A. Harootunian, U.S. Pat. No. 4,917,462; Issued: Apr. 17, 1990.]. These methods can be used to either produce a tapered micropipette or can be used to produce a tapered fiber optic element that can then be coated with metal to produce a subwavelength aperture. One aspect of these methods that can be improved is the taper angle of the tip and the core to cladding ratio when an optical fiber is employed. This is necessary for high light transmissions since it is important that the light beam, as it progresses through such a tapered structure, traverses the smallest region of subwavelength dimensions while remaining as much as possible in the core of the fiber. There have been generally two procedures to improve this characteristic of near-field optical elements. One procedure has depended on etching of the fiber tip [Jiang S. Ohsawa, H. Yamada, K. Pangaribuan, T. Chtsu, M. Imai, K. and Ikai. A.; *Jpn. J. Appl. Phys.* 31,2282 (1992); S. J. Bukofsky and R. D. Grober. Appl. Phys. Lett. 71,2749 (1997)]. A second approach has to been to use an amended versions of the earlier pulling technology [Galina Fish, Sophin Kokotov, Edward Khachatryan, Andrey Ignatov, Rimma Glazer, Anatoly Komissar, Yuri Haifez, Alina Strinkovsky, Aaron Lewis and Kjony Lieberman; Israel Patent Application Serial Number: 120181: Filed: Feb. 9, 1997, PCT filed Feb. 8, 1998]. Micropipettes have not been produced with small apertures and the thick walls that have been achieved in accordance with the present invention.

III STATE OF PRIOR ART

In the past, there has been no approach to produce a lens with a subwavelength aperture at the tip in an optical fiber or to produce an aperture having a dimension in the region of tens of nanometers or around this region, either bigger or smaller, in a micropipette.

IV SUMMARY OF THE INVENTION

The invention is a method to produce a subwavelength aperture in the tip of a tapered or untapered optical fiber in which the tip also behaves as a lens. The method also allows the production of a micropipette with a small opening in its tip, with very thick walls surrounding the tip.

V BRIEF DESCRIPTION OF THE DRAWINGS

The foregoing and additional object features and advantages will become apparent to those of skill in the art from the following detailed description of preferred embodiments, taken with the accompanying drawings, in which.

VI DESCRIPTION OF THE INVENTION

Figure 1A:
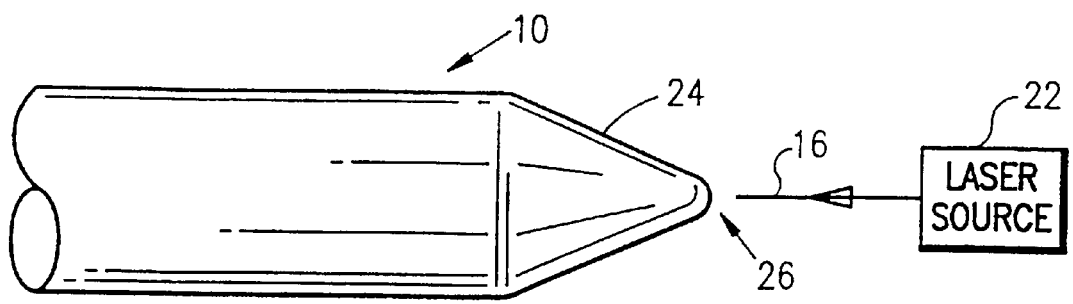
FIGS. 1A, 1B and 1C are diagrammatic illustrations of the placement of a laser beam relative to glass structures for producing combined subwavelength apertures with lenses in accordance with the present invention.
Figure 1B:
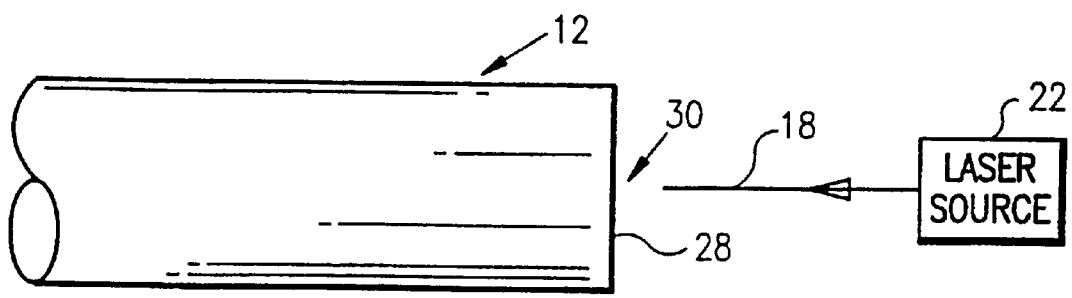
Figure 1C:
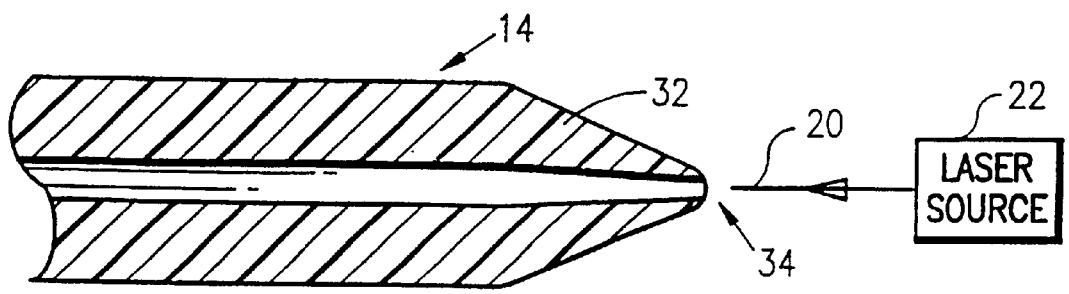
Figure 2A:
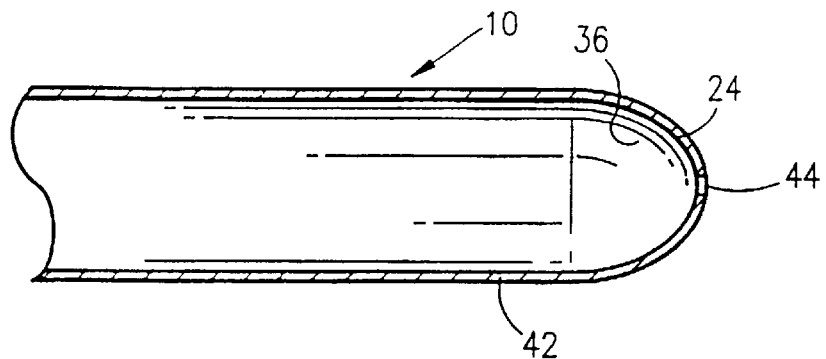
FIGS. 2A and 2B are diagrammatic illustrations of an optical fiber (in partial cross-section) and a micropipette respectively, after treatment by a laser, in accordance with the invention.
Figure 2B:
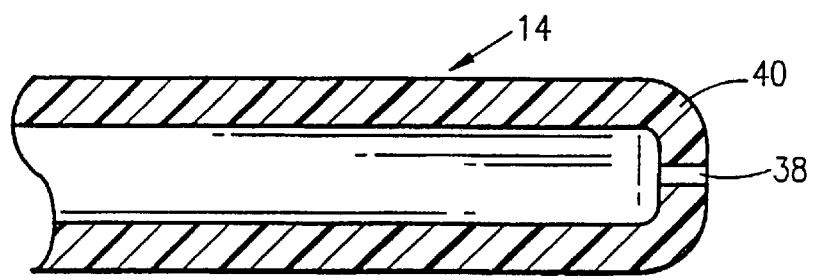

The invention is a device in which there is both a lens and a subwavelength (tens of nanometers or selected dimensions around these dimensions) aperture at the tip of an optical fiber or a small hole that could be tens of nanometers or more or less than these dimensions in a glass capillary with thick walls surrounding this hole, and a method for fabricating such devices. In order to accomplish this in one embodiment a glass structure 10, which may be an optical fiber tapered by standard Harootunian and Lewis methodology or by etching, as illustrated in FIG. 1A, or a fiber structure 12 in FIG. 1B, formed with tapering or etching, or in another embodiment a similar combination for a micropipette 14 (FIG. 1C) is placed in front of a laser beam 16 (FIG. 1A), laser beam 18 (FIG. 1B), or laser beam 20 (FIG. 1C) produced by a carbon dioxide laser 22, or some other appropriate laser beam. The laser beam and the corresponding glass structure are aligned on one axis with, for example, the tip 24 of the tapered structure 10 in the focus 26 of the laser beam 16. Similarly, beam 18 is aligned with the end 28 of structure 12 at focus 30 and beam 20 is aligned with the tip 32 of structure 14 at focus 34. Then the laser beam is turned on for a few seconds in order to melt the tip 24 into a lens 36 if it is an optical fiber 10 or 12 (FIG. 2A) and into a structure that has a small opening 38 with large (thick) walls 40 if it is a micropipette 14 (FIG. 2B). The resulting optical fiber device 10 (or 12) is then coated with metal 42 such that an aperture 44 is left opened at the tip. Alternatively, the device 10 is completely coated and then a focused ion beam or a laser such as the femtosecond laser 22 is used to make the aperture. In the case of the micropipette 14 (FIG. 2B) the device can be left uncoated.

Figure 3:
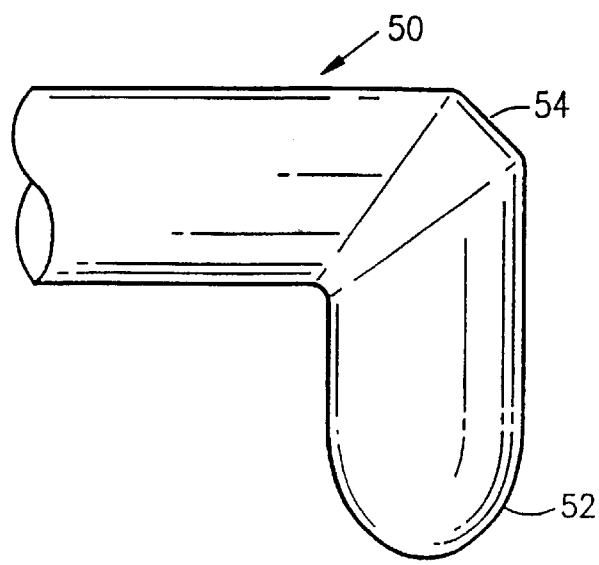
FIG. 3 is a diagrammatic illustration of a cantilevered glass structure incorporating the invention.

With both micropipettes or optical fibers, asperities can be grown on the tip either electrochemically or with such techniques as ion or electron beams to produce a fine tip on the end of structures 10, 12 or 14 for atomic force microscopy. In addition, the laser beam could also be used to heat the optical fiber or the micropipette to form a curved cantilevered device 50 (FIG. 3), having a tip 52 incorporating a lens such as lens 36 (FIG. 2A), as has been accomplished previously (K. Lieberman and A. Lewis, "Bent Probe Microscopy", U.S. Pat. No. 5,677,978; Issued: Oct. 14, 1997). The laser beam can also be used to put a flat surface 54 on the curved cantilever to provide a good reflecting surface for atomic force microscopy, although these are simply additions that this invention could also work with. In other words these alterations in the structure are compatible with this invention but the invention can be employed with or without them.

VII Advantages Over Prior Art

The above-described structures can act both as lenses and subwavelength apertures and can also behave in a hybrid fashion that has never been seen before. Specifically, it has been observed that as the distance is increased between a surface and the tip of the aperture there can be, in fact, an increase in the resolution or at the very least a maintaining of the resolution as was maintained in the near-field. This allows high resolution even with a separation between the subwavelength aperture and the object that is being imaged and this has never been seen before. In addition, in terms of near-field optics the transmission efficiency of such apertures, which is a very important characteristic is seen to increase and transmissions out of the subwavelength tip have been measured with only two orders of intensity decrease in the intensity that was injected into the fiber. Furthermore, these micropipettes would be very useful for aperturing high intensity x-ray sources.

VIII Applications

There are many areas of applications for such devices that increase the distance of high resolution that is only normally seen in the near-field. One area is in the field of information storage where resolutions below the surface can now be as high as has previously been seen only on the surface. In addition, in the area of microchip inspection where there is a technique of chemical mechanical polishing of the microchip where important features are below the surface and such tips could be useful in imaging such features. In addition, in any area of near-field optics which requires higher throughput of radiation this is an important invention. Finally, micropipettes with such structures would be very good, for example, to hold cells while measuring the electrical properties of the cells.

What is claimed is:

1. A method for producing a subwavelength near-field optical aperture, comprising:

axially aligning an optical fiber with a laser source;

positioning the laser source in opposition to a tip end of said fiber;

directing a beam of laser light from said laser source onto said tip end of said fiber;

melting the tip end to produce a lens at the end of the fiber;

coating the fiber and lens with metal; and producing in the metal at the location of the lens, an aperture having a diameter of about tens of nanometers.

2. The method of claim 1, further including forming an asperity at said tip end of said fiber to produce a high resolution point.

3. The method of claim 1, further including mounting said fiber to form a cantilevered fiber tip end.

4. The method of claim 3, further including forming an asperity at said tip end of said cantilevered fiber.

5. The method of claim 3, further including forming a mirror on an exterior surface of said cantilevered fiber for motion detection of the fiber.

6. A method for producing a subwavelength near-field optical aperture, comprising:

axially aligning a micropipette with a laser source;

positioning the laser source in opposition to a tip end wall of said micropipette;

directing a beam of light from said laser source onto said tip end wall; and melting the tip end of the micropipette to produce in the end wall of the micropipette an aperture having a diameter of tens of nanometers.

7. The method of claim 6, further including forming an asperity at said tip end to produce a high resolution point.

8. The method of claim 6, further including mounting said micropipette to form a cantilevered tip end.

9. The method of claim 8, further including forming an asperity at said tip end.

10. The method of claim 9, further including forming a mirror on an external surface of said cantilevered tip end.

11. The method of claim 8, further including forming a mirror on an external surface of said cantilevered tip end.

12. The method of claim 6, further including coating said micropipette with metal surrounding said aperture.

13. The method of claim 6, further including coating said micropipette with metal; and forming an aperture in said metal at the location of said end wall aperture.

* * * * *